(12) United States Patent
Wiessner et al.

(10) Patent No.: US 7,336,691 B2
(45) Date of Patent: Feb. 26, 2008

(54) APPARATUS FOR COMBINING BEAMS FROM REPETITIVELY PULSED LASERS ALONG A COMMON PATH

(75) Inventors: Alexander O. Wiessner, Santa Clara, CA (US); Thomas Schroeder, Goettingen (DE)

(73) Assignee: Coherent, Inc., Santa Clara, CA (US)

(*) Notice: Subject to any disclaimer, the term of this patent is extended or adjusted under 35 U.S.C. 154(b) by 113 days.

(21) Appl. No.: 11/386,637

(22) Filed: Mar. 22, 2006

(65) Prior Publication Data

US 2006/0215725 A1    Sep. 28, 2006

Related U.S. Application Data

(60) Provisional application No. 60/664,788, filed on Mar. 24, 2005.

(51) Int. Cl.
*H01S 3/08* (2006.01)
(52) U.S. Cl. .......................................... 372/107; 372/25
(58) Field of Classification Search ................ 372/107, 372/25, 29.023; 359/234, 368
See application file for complete search history.

(56) References Cited

U.S. PATENT DOCUMENTS

| | | | | |
|---|---|---|---|---|
| 3,669,547 | A | * 6/1972 | Sell | 356/325 |
| 4,062,046 | A | * 12/1977 | Pratt et al. | 348/86 |
| 4,311,360 | A | 1/1982 | Hodson et al. | 350/174 |
| 4,672,168 | A | 6/1987 | Saunders et al. | 219/121 LK |
| 4,823,351 | A | * 4/1989 | Endemann et al. | 372/20 |
| 5,294,940 | A | 3/1994 | Wennagel et al. | 345/31 |
| 5,325,393 | A | 6/1994 | Nighan, Jr. et al. | 372/97 |
| 6,014,206 | A | 1/2000 | Basting et al. | 356/138 |
| 6,423,925 | B1 | 7/2002 | Sukhman et al. | 219/121.6 |
| 6,489,985 | B1 | 12/2002 | Brodsky et al. | 347/247 |
| 6,580,055 | B2 | 6/2003 | Iso | 219/121.7 |
| 6,816,535 | B2 | * 11/2004 | Ho et al. | 372/107 |
| 2001/0050931 | A1 | * 12/2001 | Iso | 372/25 |
| 2004/0211887 | A1 | 10/2004 | Lofthouse-Zeis et al. | 250/214 R |

* cited by examiner

*Primary Examiner*—Minsun Oh Harvey
*Assistant Examiner*—Tuan N. Nguyen
(74) *Attorney, Agent, or Firm*—Stallman & Pollock LLP

(57) ABSTRACT

Two pulse sequences are delivered by two lasers. A rotating segmented mirror having one or more reflective areas and one or more transmissive areas is rotated synchronously with the delivery of the pulse sequences to transmit pulses from one sequence, and to reflect pulses from the other sequence at intervals.

18 Claims, 3 Drawing Sheets

APPARATUS FOR COMBINING BEAMS FROM REPETITIVELY PULSED LASERS ALONG A COMMON PATH

PRIORITY CLAIM

This application claims the priority of U.S. Provisional Application No. 60/664,788, filed Mar. 24, 2005 the disclosure of which is incorporated by reference.

TECHNICAL FIELD OF THE INVENTION

The present invention relates in general to operating repetitively pulsed lasers. The apparatus relates to temporally interleaving pulse sequences from two such repetitively pulsed lasers along a common path.

DISCUSSION OF BACKGROUND ART

In certain applications of pulsed laser radiation, a specific wavelength of radiation, characteristic of a certain type of laser, may be preferred, or may even be necessary. In such applications, the maximum average power in a pulse sequence from a single one of that type of laser may often be less than would be desirable for that application, for example for providing a desired manufacturing throughput. Maximum average power can be limited because the laser cannot generate sufficient energy per pulse, or cannot deliver pulses having sufficient energy at a sufficiently high pulse-repetition frequency (PRF).

One means of overcoming this limitation is to combine pulse sequences from two lasers, each capable of delivering pulses of sufficient energy for the application, interleaved in time at a site to be irradiated by the pulses. This can provide a combined pulse sequence having a PRF twice that of the individual lasers and, accordingly, twice the average power, and can effectively double the throughput of an application without providing an additional tool or delivery device for the pulses.

In an application requiring a high spatial precision for delivery of the pulses, for example, laser machining or laser marking, it would be important to have pulses from each laser arrive at precisely the same location on material being machined or marked. Accordingly, there is a need for apparatus for combining beams for two repetitively pulsed lasers that will temporally interleave pulses, and spatially combine the pulse sequences, precisely, along a common beam path.

SUMMARY OF THE INVENTION

The present invention is directed to a method of operating pulsed lasers. In one aspect, the method comprises delivering first and second sequences of pulses or bursts of pulses from respectively the first and second pulsed lasers along respectively first and second beam paths. A rotatable member is rotated in the first and second beam paths. The rotatable member includes at least one reflective area and one transmissive area. The first and second beam paths are aligned with the rotatable member. The rotation of the rotatable member is synchronized with the delivery of the first and second pulse sequences such that a pulse or a burst of pulses from the first sequence thereof is transmitted through the transmissive area of the rotatable member and a pulse or a burst of pulses in the second sequence thereof is reflected by the reflective area of said rotatable member along a common path with the transmitted pulse, but at a different time.

In a preferred embodiment of the inventive method, each of the first and second beam paths includes a beam steering unit. The direction and position of transmitted and reflected pulses is monitored. If the monitored direction or position of either a transmitted or reflected pulse has diverted from the common path, a corresponding one of the first and second paths is realigned by the appropriate beam steering unit such that a subsequently transmitted or reflected pulse travels along the common path.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain the principles of the present invention.

DETAILED DESCRIPTION OF THE INVENTION

Figure 1:
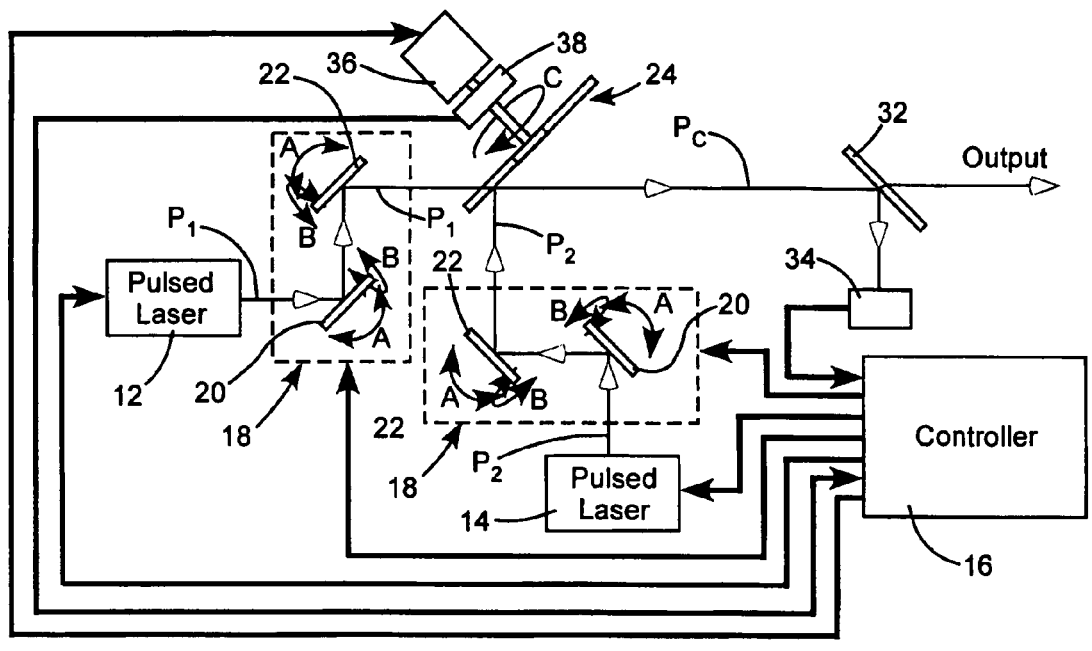
FIG. 1 schematically illustrates a preferred embodiment of apparatus in accordance with the present invention including two repetitively pulsed lasers, a rotating segmented mirror having a rotation rate synchronized with the pulse delivery rate of the lasers and arranged cooperative with two beam-steering systems and a beam-position and pointing detector for temporally interleaving the pulses and combining and maintaining the direction of the pulses along a common path.

Referring now to the drawings, wherein like components are designated by like reference numerals, FIG. 1 schematically illustrates one preferred embodiment 10 of laser-beam combining apparatus in accordance with the present invention. In FIG. 1, beam paths are indicated by fines lines, with the propagation direction along the paths indicated by open arrowheads. Electronic interconnections are designated by bold lines with the direction of communication indicated by solid arrowheads. It should be borne in mind that optical pulses are traveling along the beam paths rather than continuous radiation, however, a pulse of even only 20 nanoseconds (ns) duration will have a "length" along a beam path of more than 6.5 meters (m). Accordingly, the "beam" representation of pulses is appropriate here. It should also be borne in mind, however, that the duty cycle of pulses is usually only a fraction of one-percent. Accordingly, at pulse repetition rates of about 10 kilohertz (kHz) there would be a distance between the 6.5-meter beams (pulses) of 30 kilometers (km) if the pulses could travel that far unimpeded.

Apparatus 10 includes a repetitively pulsed laser 12 and a repetitively pulsed laser 14. The lasers include circuitry and switches (not shown) controllable to regulate pulse-repetition frequency (PRF) of the lasers. Such switching arrangements are well-known to practitioners of the art. By way of example, the laser could be Q-switched lasers in which the PRF is regulated by regulating the Q-switching rate, or free running lasers in which the PRF is controlled by energizing the laser gain-medium with a pulsed energy source of controllable PRF. An electronic controller controls the PRF of each laser. The controller also controls the instant of starting a pulse sequence in each laser. Each laser delivers pulses at the same PRF, with pulses from one of the lasers delivered at a mid point in time between corresponding pulses from the other laser, such that, in combination, pulses from both lasers will form a pulse sequence having twice the PRF of any one of the lasers. Those skilled in the will recognize, however, from the description provided herein, that the present invention is not limited to this particular pulse sequencing of the lasers. By way of example, one of the lasers may deliver a sequence of individual pulses at a particular PRF while the other laser generates a sequence of bursts of pulses with a burst repetition frequency (BRF) equal to the PRF of the individually pulsed laser. The repetition frequency of pulses in a burst thereof, of course would be much higher than the BRF, for example about five or more times higher.

Figures 2A, 2B:
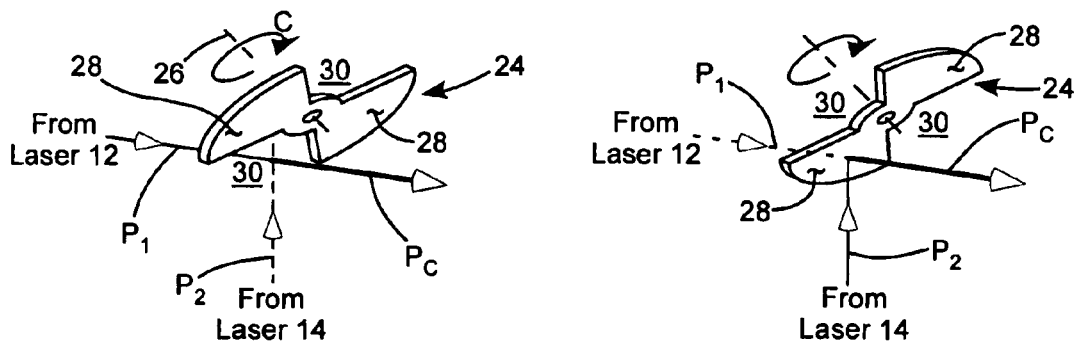
FIG. 2A is a three-dimensional view schematically illustrating one example of the rotating segmented mirror of FIG. 1 including two reflective segments and two open segments, with a beam from a first of the two lasers being transmitted through one of the open segments of the mirror along the common path.
FIG. 2B is a three-dimensional view schematically illustrating the rotating segmented mirror of FIG. 2A, with a beam from a second of the two lasers being reflected from one of the reflective segments of the mirror along the common path.

Continuing now with reference to FIG. 1, and with reference in addition to FIG. 2A and FIG. 2B, a beam (pulse) from laser 12 follows a path $P_1$ via a beam-steering unit 18, including steering mirrors 20 and 22, to a rotating segmented mirror 24. In the beam-steering unit, each mirror is tiltable in mutually perpendicular planes as indicated by double headed arrows A and B. This provides that both the position of the beam and the pointing (direction) of the beam can be adjusted. Segmented mirror 24 rotates about a rotation axis 26 (see FIGS. 2A and 2B) as indicated by single headed arrow C.

Segmented mirror 24, in this example thereof, has two diametrically opposite mirrored segments 28 and two diametrically opposite open segments (gaps or apertures) 30. If an open area 30 of the segmented mirror is aligned with path $P_1$ (see detail in FIG. 2A), the beam (pulse) from laser 12 can pass through the open area along a path $P_C$, here aligned with path $P_1$. Path $P_C$ is a desired common path for beams (pulses) from lasers 12 and 14.

A beam (pulse) from laser 14 follows a path $P_2$ via another beam-steering unit 18 including steering mirrors 20 and 22 tiltable as described above. Path $P_2$ intercepts the plane of segmented mirror 14, and, if a mirrored area 28 of the segmented mirror is aligned with path $P_2$ (see detail in FIG. 2B), the beam (pulse) from laser 14 is reflected by the mirrored area of the segmented mirror along common path $P_C$. The alignment of paths $P_1$ and $P_2$ is such that the paths have a junction at the mirror. Here, it should be noted that while a pulse in pass $P_2$ is being reflected, there is no pulse being delivered along pass $P_1$. Similarly while a pulse in pass $P_1$ is being transmitted, there is no pulse being delivered along pass $P_1$. Mirror 24 does not function as a "chopper" wheel for preventing passage of radiation, but in fact functions in an entirely opposite way Segmented mirror 24 is rotated by a motor 36. A shaft encoder 38 senses the rotation speed and instant angle of the motor and relays that information to controller 16. The shaft encoder is also calibrated cooperative with controller such that the controller knows whether a mirrored area 28 or an open area 30 of the segmented mirror is aligned with common path $P_C$. The controller can thereby adjust the pulse sequences from the lasers such that the pulses can be temporally interleaved along common path $P_C$.

Figure 3A:
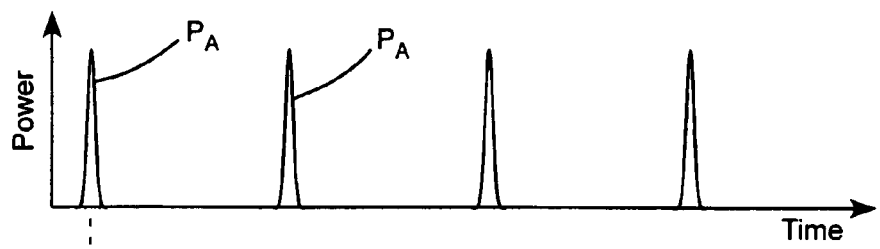
FIGS. 3A-C are graphs schematically illustrating one example of temporal interleaving of two pulses sequences along a common path in the apparatus of FIG. 1.
Figure 3B:
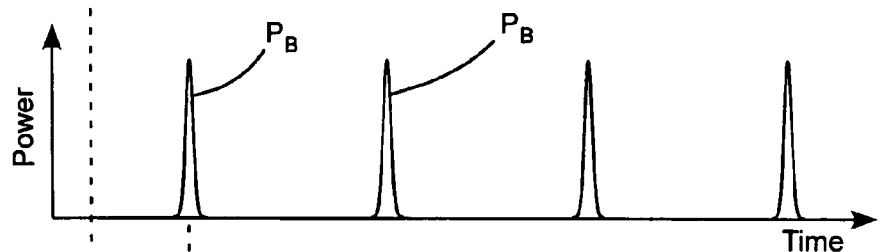
Figure 3C:
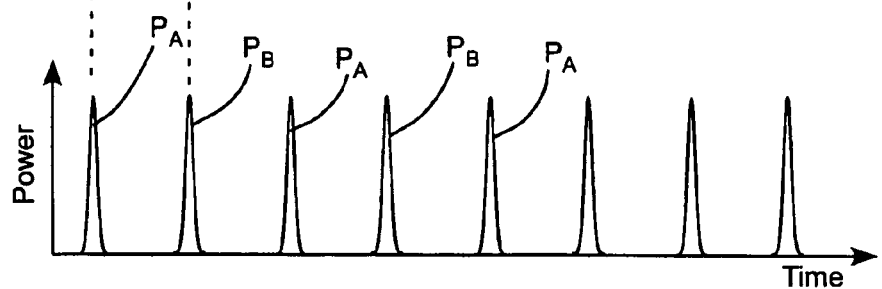

By way of illustration, FIGS. 3A and 3B are graphs schematically respectively illustrating sequences of pulses $P_A$ and $P_B$ propagating along paths $P_1$ and $P_2$ respectively. FIG. 3C is a graph schematically illustrating the pulse sequences temporally interleaved along path $P_C$, with pulses $P_A$ and $P_B$ delivered alternately. In FIGS. 3A-C the pulse sequences are sequenced such that pulses in the common path are equally spaced in time. This sequencing, however, should not be considered as limiting the present invention.

Figure 4A:
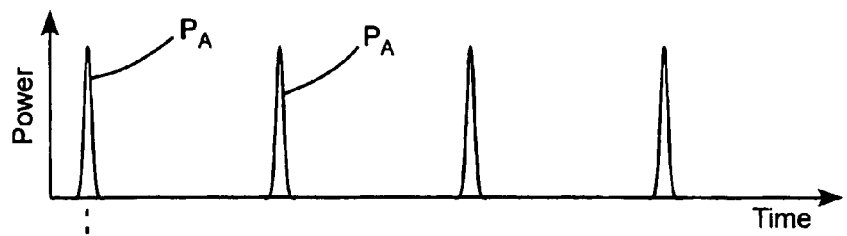
FIGS. 4A-C are graphs schematically illustrating one example of temporal interleaving of a sequence of individual pulses with a sequence of bursts of pulses along a common path in the apparatus of FIG. 1.
Figure 4B:
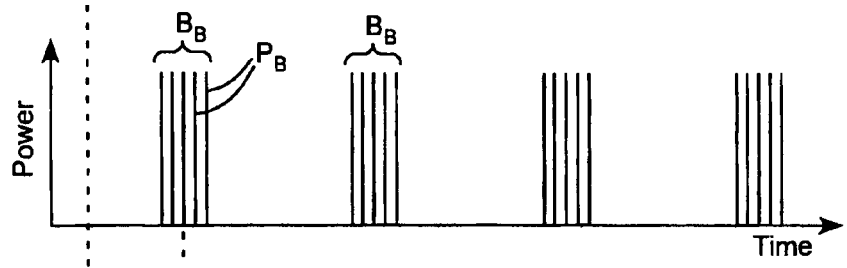
Figure 4C:
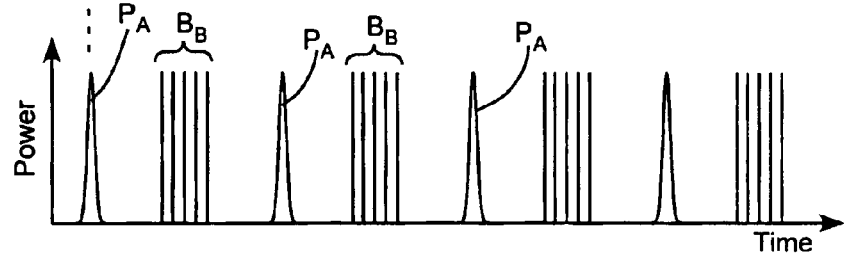

FIGS. 4A and 4B are graphs schematically respectively illustrating a sequence of pulses $P_A$ propagating along path $P_1$, and a sequence of bursts $B_B$ of pulses $P_B$ propagating along path $P_2$. FIG. 4C is a graph schematically illustrating the pulse sequence temporally interleaved with the burst sequence along path $P_C$. Those skilled in the art will recognize without further illustration that there can be burst sequences along each of paths P1 and P2 and that those burst sequences can be interleaved along path $P_C$. In either case, care must be taken to ensure that the angular extent of transmissive or open areas of the rotating segmented mirror is sufficient to accommodate the duration of a pulse burst in a sequence thereof.

In one preferred arrangement, motor 36 is a variable speed motor, rotation speed and PRF of the individual lasers can be slaved to a master clock (not shown) in the controller, with appropriate delays in control connections to the lasers and the motor being provided in the controller for synchronizing laser pulse (or pulse burst) firing with the position of segmented mirror 24. In another arrangement, the PRF of the lasers may be constant and the rotation speed of the motor is varied until the open and reflected areas of the rotating segmented mirror are synchronized with the laser pulses.

In most lasers, the direction (pointing) of a beam leaving the laser will not be exactly constant. Random or systematic variations in pointing, relatively small, but nevertheless significant and potentially troublesome, can occur for several reasons. Such reasons include changes in thermal-lensing of solid transparent components in the laser resonator or in the beam path, and thermal-gradient-induced distortion in mechanical components of a laser resonator. In apparatus 10, a beamsplitter 32, directs a sample of any beam traveling in the direction of common path $P_C$ to a position and pointing detecting arrangement 34, preferably a detector for near and far field including two four-quadrant detectors. As apparatus 10 is synchronized such that pulses from lasers 12 and 14 are temporally interleaved, the detector detects the position and pointing of each laser, in turn, during the delivery of pulses. As the controller is controlling triggering the firing of the pulses, the controller will always know which laser beam-position and pointing is being detected. The near field and far field of the laser are detected. In one preferred arrangement, the near field (position) is detected using a 4-quadrant detector (not shown). The far field (pointing) is detected by focusing the beam onto another four-quadrant detector (not shown) with a lens (not shown), with the detector placed precisely at the focal plane of the lens. As the operation of such a position and pointing arrangement is well known in the art and a detailed description thereof is not necessary for understanding principles of the present invention such a detailed description is not presented herein, and the position and pointing detector is represented, for convenience of illustration as a single unit with components thereof, such as the quadrant detectors and the lens, not shown as noted above.

Examples of systems which include detectors for monitoring beam position and direction include U.S. Pat. No. 6,014,206 and U.S. Application Publication No. 2004/0211887 both incorporated herein by reference.

Controller 16 controls tilting of the mirrors 20 and 22 of beam steering units 18 to compensate for position and pointing variations in each laser such that the beams from each are aligned along the desired common path $P_C$, and are maintained in alignment along that common path while the apparatus is operating, i.e., while the lasers are firing pulses. It is possible to use only one alignment arrangement and maintain the alignment of one path with the other. This will not, however, compensate for deviation of the actual common path from the desired common path.

Figure 5:
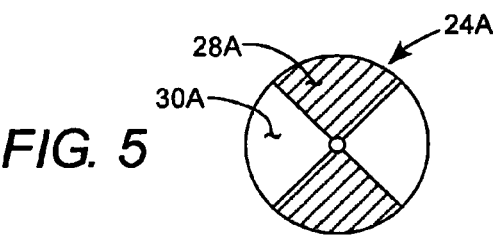
FIG. 5 schematically illustrates another example of the segmented mirror of FIG. 1, similar to the rotating segmented mirror of FIGS. 2A and 2B, but wherein the mirror is formed on a disc-shaped substrate, with reflective coatings providing the reflective segments, and antireflection coatings providing the open (transmissive) segments.

In the above-presented description of the inventive beam combining apparatus, segmented mirror 24 is described as having two reflective areas and two open areas. Clearly other arrangements of reflective and open (transparent) areas are possible without departing from the spirit and scope of the present invention. By way of example, instead of providing actual open areas, gaps, or apertures in the mirror to allow the passage of pulses from laser 12, the mirror could be formed on a transparent circular substrate with mirrored coatings deposited thereon in the shape of segments by depositing the reflective coatings through an appropriately-shaped mask, leaving transparent areas of the substrate for transmission of pulses from laser 12. These transparent areas would preferably be furnished with antireflection coatings on both sides of the substrate. Such an arrangement is schematically depicted in FIG. 5, wherein a disc 24A has mirrored areas 28A indicated by cross hatching and transparent areas 30A, which would be preferably antireflection coated as discussed above.

Figure 6:
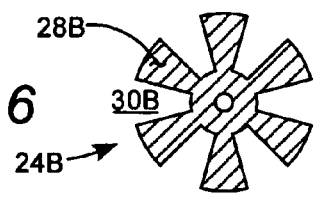
FIG. 6 schematically illustrates another example of the segmented mirror of FIG. 1, similar to the rotating segmented mirror of FIGS. 2A and 2B, but wherein there are six reflective segments and six open segments.

Regarding the number of segments in a segmented mirror, there must be at least one mirrored (reflective) segment or reflective area and at least one open or transparent area, gap, or aperture. FIG. 6 schematically depicts a segmented mirror 24B having six reflective segments 28B and six open areas 30B. The minimum size of a reflective area or an open area will be determined by the diameter of the mirror and the size of a beam to be reflected and transmitted by the mirror. If there is only one open area and one reflective area, the mirror must be rotated at a rotation rate equal to the PRF of the lasers. For any number of reflective and open areas greater than one, the rotation speed will be determined by the PRF divided by the number of reflective areas (or open areas).

In summary, the present invention is described above in terms of a preferred and other embodiments. The invention is not limited, however, to the embodiments described and depicted. Rather, the invention is limited only by the claims appended hereto.

What is claimed is:

1. A method of operating first and second pulsed lasers, comprising:
    delivering first and second sequences of one of individual pulses and bursts of pulses from respectively the first and second pulsed lasers along respectively first and second beam paths;
    rotating a rotatable member in said first and second beam paths, said rotatable member having opposed first and second surfaces, said rotatable member including at least one reflective area and one transmissive area; and
    aligning said first beam path with the first surface of said rotatable member and aligning said second beam path with the second surface of said rotatable member, and synchronizing said rotation of said rotatable member with the delivery of said first and second sequences such that an individual pulse or a burst of pulses from said first sequence thereof is transmitted past said rotatable member through said transmissive area of said rotatable member and an individual pulse or a burst of pulses from said second sequence thereof is reflected by said reflective area of said rotatable member along a common path with said transmitted individual pulse or burst of pulses from said first sequence thereof, but at a different time.

2. The method of claim 1, further including monitoring the position and direction of any one of a transmitted first-sequence pulses or burst of pulses and a reflected second-sequence pulse or burst of pulses and, if the monitored position or direction has diverted from the common path, re-aligning a corresponding one of the first and second paths such that a subsequent pulse or burst of pulses from the corresponding sequence thereof travels along the common path.

3. The method of claim 1, wherein said first and second sequences of pulses are sequences of individual pulses.

4. The method of claim 1, wherein said first sequence of pulses is a sequence of individual pulses and said second sequence of pulses is a sequence of bursts of pulses.

5. The method of claim 1, wherein said first and second sequences of pulses are sequences of bursts of pulses.

6. Optical apparatus, comprising:
    first and second pulsed lasers each thereof arranged to deliver one of a sequence of individual pulses and a sequence of bursts of pulses along respectively first and second beam paths;
    a rotatable member located in said first and second beam paths, said rotatable member having opposed first and second surfaces, said rotatable member including at least one reflective area and one transmissive area; and
    wherein said first first beam path is aligned with the first surface of said rotatable member and wherein the second beam path is aligned with the second surface of the said rotatable member, and rotation of said rotatable member is synchronized with the delivery of said sequences of pulses or bursts of pulses such that an individual pulse or a burst of pulses from one of said sequences thereof is transmitted past said rotatable member through said transmissive area of said rotatable member and an individual pulse or a burst of pulses from the other of said sequences thereof is reflected by said reflective area of said rotatable member along a common path with said transmitted individual pulse or burst of pulses, but at a different time.

7. The apparatus of claim 6, further including an optical arrangement for varying the alignment of at least one of said first and second beam paths.

8. The apparatus of claim 7, further including a detector arranged to monitor the position and direction of any one of a transmitted pulse or burst of pulses and a reflected pulse or burst of pulses, and a controller cooperative with said detector and said beam path alignment arrangement in a manner such that if the monitored position or direction has diverted from the common path, said at least one of the first and second beam paths can be realigned such that a subsequent pulse or burst of pulses from the corresponding sequence thereof travels along the common path.

9. The apparatus of claim 7, wherein there is a first optical arrangement for varying the alignment of said first beam path and a second optical arrangement for varying the alignment of said second beam.

10. The apparatus of claim 9, further including a detector arranged to monitor the direction of transmitted and reflected pulses or burst of pulses, and a controller cooperative with said detector and said beam path alignment arrangements in a manner such that if the monitored position or direction of a reflected or transmitted pulse diverts from the common path, at least one of the first and second beam paths can be realigned such that subsequently delivered reflected and transmitted pulses travel along the common path.

11. The apparatus of claim 10, wherein said controller is arranged to control delivery of pulses from said first and second lasers.

12. The apparatus of claim 11, further including a drive motor for rotating said rotatable member and means for monitoring the rotation of said rotatable member, said drive motor and said rotation-monitoring means being cooperative with said controller for synchronizing delivery of said pulses with rotation of said rotatable member.

13. The apparatus of claim 7, wherein said alignment varying arrangement includes first and second mirrors located in the beam path, each of said mirrors being tiltable in mutually perpendicular planes.

14. The apparatus of claim 6, wherein said rotatable member has a plurality of reflective areas and an equal plurality of transmissive areas.

15. The apparatus of claim 14, wherein said transmissive areas are provided by free space between said reflective areas.

16. The apparatus of claim 15, wherein said rotatable member is a bow-tie shaped member having two reflective segments providing two reflective areas.

17. The apparatus of claim 14, wherein said rotatable member is a disc of a transparent material and said reflective areas are mirrored segments of said disc.

18. A laser system comprising:

a first laser generating a first pulsed output beam;

a second laser generating a second pulsed output beam:

a rotatable beam diverter having first and second opposed surfaces, said diverter including at least one reflective region and one transmissive region;

a motor for rotating the beam diverter;

a first beam position adjuster for directing the first beam to the first surface of the diverter;

a second beam position adjuster for directing the second beam to the second surface of the diverter;

a controller for controlling the firing of the first and second lasers and the rotation of the motor, said first and second lasers being fired at different times and the motor being operated to rotate the diverter to selectively transmit the first beam past the diverter through the transmissive region and reflect the second beam off the reflective region so that both beams travel along a common path; and a detector for monitoring the position of the pulses after passing the diverter and generating output signals corresponding thereto, said controller further controlling the first and second beam position adjusters based on said output signals to maintain both the first and second beams along a common path.

* * * * *